E. S. STACK.
COMBINED FAUCET AND RELIEF VALVE.
APPLICATION FILED MAR. 7, 1916.
1,249,233. Patented Dec. 4, 1917.
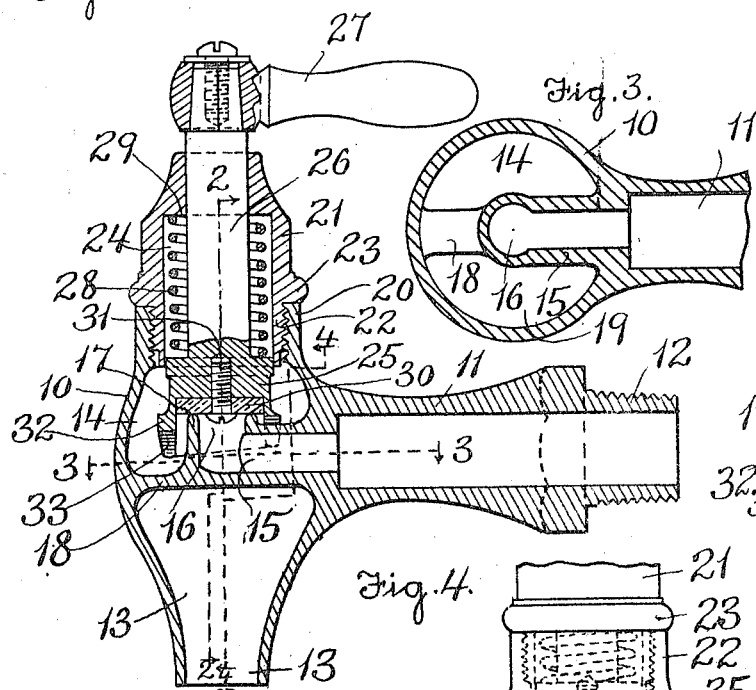
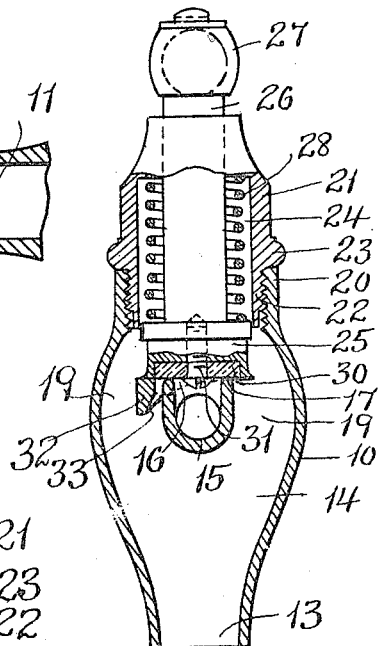
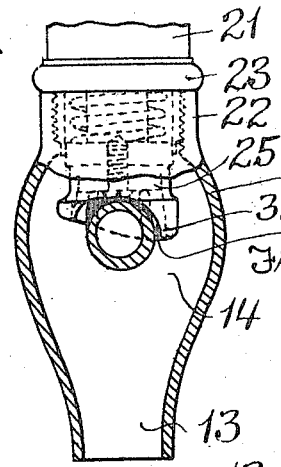
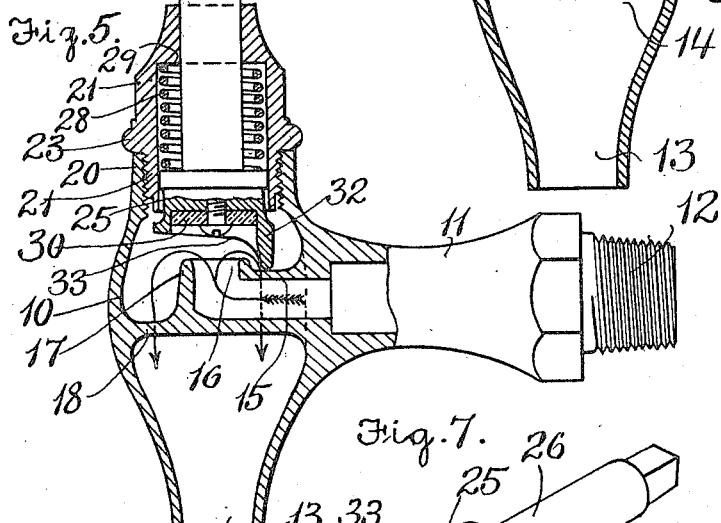
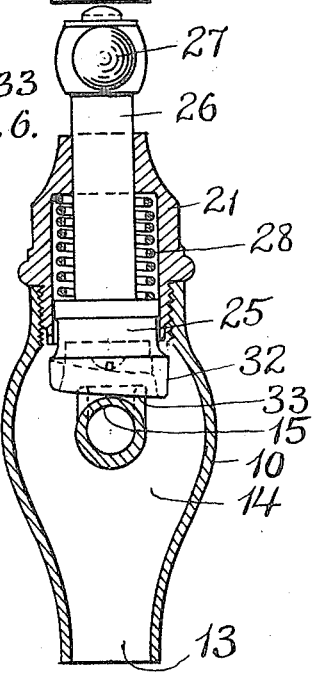
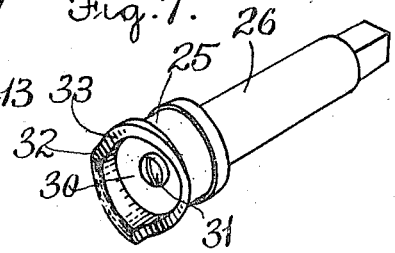
Inventor:
Elmer S. Stack

UNITED STATES PATENT OFFICE.

ELMER S. STACK, OF WEST SOMERVILLE, MASSACHUSETTS.

COMBINED FAUCET AND RELIEF-VALVE.

1,249,233.      Specification of Letters Patent.      Patented Dec. 4, 1917.

Application filed March 7, 1916. Serial No. 82,572.

*To all whom it may concern:*

Be it known that I, ELMER S. STACK, a citizen of the United States, and resident of West Somerville, in the county of Middlesex and State of Massachusetts, have invented certain new and useful Improvements in Combined Faucets and Relief-Valves, of which the following is a specification.

The present invention relates to a fitting or attachment for water systems adapted to serve as a delivery faucet for any part of such system, and further adapted to be connected with a hot water service pipe to perform the additional function of a relief valve to permit escape of the water and relief of pressure in case the temperature and pressure should become so high as to injure the integrity of any part of the system. The exact nature of the invention and the novel principles and features which are involved therein appear from the following detailed description and the annexed illustration of a particular device in which I have embodied these principles and features.

In the accompanying drawings,

Figure 1 is a vertical longitudinal section of a particular device in which I have embodied my invention.

Fig. 2 is a vertical cross section on line 2—2 of Fig. 1.

Fig. 3 is a horizontal section on line 3—3 of Fig. 1.

Fig. 4 is a partial elevation and section on line 4—4 of Fig. 1 looking in the direction of the arrows.

Figs. 5 and 6 are views similar to Figs. 1 and 2, respectively, showing the valve of the fitting in its opened position, the preceding figures showing the valves closed.

Fig. 7 is a perspective view of the member which constitutes the valve proper of the device.

The same reference characters indicate the same parts in all the figures.

I will first describe the particular fitting or device here illustrated in detail, and then explain the advantages and the general novel and inventive principles involved therein. Referring to the drawings, 10 represents a casing which has a tubular inlet 11 at one side, terminating in a threaded nipple 12 for connection with a water pipe or any other character of mounting, and having at its lower portion an outlet or delivery tube 13, these parts being in general similar to the corresponding parts of the usual water faucet. The communication between the inlet tube and the body or main chamber 14 of the casing is made through a nozzle 15 which extends from the inlet tube into the center of the casing and has an upwardly directed delivery orifice 16 surrounded by a lip 17, which forms a valve seat. The end of the nozzle is connected with the outer wall of the chamber 14 by a web 18 provided simply to secure strength, but there are wide open spaces 19 between the nozzle and outer walls at each side, as shown in Fig. 2, through which the water may flow freely as rapidly as it can pass out of the orifice 16. Conveniently the parts thus described are all made as a single casting, the upper part of which is formed by an open internally threaded tubular lip 20.

A bonnet 21 which has an externally threaded terminal lip 22 is fitted in the lip 20 and is screwed down until a bead or shoulder 23 bears firmly against the end of the lip 20 and makes a tight joint. The interior of the bonnet 21 is formed with a chamber 24 in which is partially contained a valve 25, the latter making a sufficiently close fit with the walls of the chamber and being adapted to rotate and move endwise therein. A valve stem 26 extends from the valve through the upper end of the bonnet 21 in which it has a sufficiently close sliding fit, and on the end of this spindle is secured a handle 27 in any ordinary or desired way, which handle may be any one of those commonly used for faucets and valves, or may have any other desired character. A spring 28 surrounds the valve stem and is contained within the chamber 24, pressing at one end against the valve 25 and reacting at its other end against the end wall 29 of the valve casing. The valve 25 overlies the orifice 16 of the inlet nozzle and is firmly pressed against the seat formed by the lip 17 of such nozzle, by the spring 28. Preferably the valve is provided with a packing or washer 30 secured by a screw 31, to make a leakage tight joint with the valve seat, although of course the washer is a detail which may be omitted if a sufficiently tight joint can be made in any other way. The end of the valve next to the nozzle is formed with a flange or lip 32 which surrounds the valve seat 17 and the lower surface 33 of which is formed as a cam surface, different points of such surface extending to different extents beyond that surface of the valve which makes contact with the seat. The preferred form of the cam surface 33 is clearly indicated by the drawing, and particularly by Figs. 2, 5, 6, and 7 thereof. In general the form of this surface is that of a helix, although not necessarily of regular and uniform pitch. The exact curvature of the cam surface is a feature which can be designed variously according to the requirements of the circumstances in which any particular form of the device may be used.

The cam rib 32 extends over the nozzle 15, and the highest part of the cam, that is the part which projects least from the seating surface of the valve, has a less amount of projection than the projection of the valve from the upper side of the nozzle. Therefore when this part is over the nozzle, which is the position shown in Figs. 1, 2, and 4, the cam is disengaged from the nozzle and the seating face of the valve is pressed against the valve seat by the full force of the spring 28. When the valve handle is turned the downwardly inclined cam surface is carried over and into contact with the nozzle, thereby causing the valve to be lifted from the valve seat, until when turned into approximately the position shown in Figs. 5 and 6, the deepest part of the cam bears on the nozzle and causes separation of the valve from the seat to the greatest possible extent. In that position the valve is fully opened and the maximum flow of liquid is permitted to take place.

The above described characteristics of the valve adapt it to serve all the uses of a faucet perfectly. In addition the spring which yieldingly holds the valve seated when in its closed position permits the valve to be removed from the seat under excessive pressure and thereby permits escape of sufficient water to relieve the pressure. Thus the faucet is also a relief valve adapted to be connected with any pipe in which the pressure is subject to fluctuations and is liable to exceed a safe amount, such as the hot water pipe of a plumbing system which is connected with the heater or boiler wherein the water is heated. Where such a system is a closed one, and is entirely filled with water, it is necessary to provide some sort of a relief to permit escape of water at times when the water gets so hot as to have its pressure raised beyond the safe point. The valve or faucet hereinbefore described performs all the functions of such a relief valve, opening sufficiently to permit escape of water when the pressure due to heating becomes great enough to overcome the spring 28. Said spring is naturally made of such a strength that it will yield before the pressure becomes great enough to threaten bursting of the boiler, or heater, or any of the pipes and connections.

The fact that this relief valve is also a faucet makes it superior to the ordinary spring loaded relief valves for water systems. The ordinary relief valve is not opened except on occasions when the pressure becomes excessive, consequently if such occasions are few and far between there is a possibility of the valve becoming stuck in its casing or to the seat, by reason of corrosion, collection of sediment, formation of scale, and many other causes. When such a valve becomes stuck in its closed position it will not open at the pressure for which it is designed, and therefore becomes not only useless but worse than useless, because of the reliance placed upon it.

The benefit which arises from the fact that my relief valve is also a faucet, is that, being a faucet, it is in constant use and therefore is kept in free working order. The rotation which is given to the valve whenever it is opened and closed frees the valve in the case, preventing it from sticking there, and also rubs and cleans the contacting surfaces of the valve and seat, so that no sediment, scale, corrosion or other cause of sticking may form or collect.

As a faucet my novel device has certain advantages in that the arrangement of the nozzle with respect to the valve keeps the seating face of the valve clean by reason of the scouring action of the water jet issuing from the nozzle, and the gradual inclination of the cam surface 33 makes it possible to turn the valve handle from opened to closed position as rapidly as may be desired without danger of a water hammer action being set up. It will be noted particularly from Figs. 2, 5, and 7 that the cam inclination for a considerable distance from the highest point of the cam is very gradual and slight, whereby the handle must be turned through a wide angle before the valve seats after being so nearly seated as to materially restrict the flow. This construction prevents instantaneous closing of the valve from a wide opened position, whereby the water hammer action is made impossible.

There is no need of packing between the valve and the walls of the valve casing or between the valve rod and the opening in the end wall of the valve casing, but these parts may be made with a sufficiently loose fit to permit of their movement with the utmost freedom. The chamber 14 in the faucet being open at the bottom and having an inlet smaller than its outlet there is practically no opportunity for back pressure to accumulate and no tendency to force the water past the valve and the valve stem; and besides, the tendency of the jet of water, which is deflected downwardly by the cylindrical cam 32, is to draw out any water which may be in the upper part of the chamber. Hence there is no tendency toward leakage past the valve and valve stem and no necessity for packing, which might have the effect of impeding the desired free movement of the valve.

It is to be understood that I contemplate making various modifications in the structure of the fitting without departing from the invention and within the scope and spirit of the appended claims. For example, instead of making the cam outside of the valve seat, it might be possible to make the valve seat and cam of the same radius, having the seat offset complementally to the cam surface, whereby the valve would be closed in one position and opened in all other positions. Again, modifications may be made in the arrangement of the nozzle. It is not essential that the cam should operate by engaging the nozzle directly, for the part of the nozzle which is engaged by the cam is simply an abutment for the cam, and its place might be taken by an abutment of any other character arranged in any other manner in connection with a nozzle located otherwise than as here shown.

What I claim and desire to secure by Letters Patent is:

1. A faucet comprising a casing, a nozzle extending into said casing and having an orifice, a rotatably mounted valve arranged to seat on the rim of said orifice, means constantly pressing said valve yieldingly toward said rim, the valve being otherwise free to move away from the orifice, means for rotating said valve about an axis transverse to the plane of its seating surface, said valve being arranged in part as a cam having points variously distant from a plane perpendicular to its axis, and the nozzle having an abutting portion for engagement with said cam, whereby rotation of the valve causes the same to be respectively seated and unseated.

2. In a faucet, an inlet nozzle having an orifice at one side and a seat surrounding said orifice, a rotatably mounted valve in line with the orifice arranged to co-act with said seat, said valve being in part an axially extending cam surrounding said seat and extending across the nozzle, different points of said cam extending different distances beyond the plane of the valve seat, a handle connected with the valve for rotating the same, and a spring bearing on the valve and pressing it toward the seat, said cam being caused by rotation of the handle to engage the nozzle and thereby displace the valve from the seat.

3. A faucet comprising a casing, a bonnet mounted in one side of said casing having a chamber, a valve fitting freely in the inner end of said chamber and having a stem extending out through the end of the bonnet, a nozzle entering the valve casing having an orifice directed toward said valve, the rim of which orifice forms a seat with which the adjacent face of the valve co-acts, a spring acting on said valve forcing the same toward said seat, and a cam element on the valve surrounding the seat, different points of said cam extending to different distances from the plane of the seat, the casing having an abutment whereon said cam bears when the valve is turned.

4. A combined faucet and relief valve comprising a casing having an admission nozzle with a seating face surrounding the orifice thereof, a valve stem entering the casing and having a valve on its inner end which co-acts with said seating face, a spring pressing said valve toward said seating face, the valve having an axially extending annular rib surrounding said face, the extremity of said rib forming a cam of which different points are located at different distances from the plane of said seating face, and an abutment for said cam arranged in position to be engaged thereby when the valve is turned, whereby to cause unseating of the valve and permit seating thereof, the valve being also adapted to yield away from the seating face when acted upon by excessive pressure of fluid in the nozzle.

5. A faucet comprising a casing having an inlet nozzle with an orifice and a seat surrounding said orifice, a valve arranged to co-act with said seat and being movable in line with the axis of said orifice, a spring pressing the valve toward said seat, and an axially extending flange on the valve surrounding the seat, the extremity of the flange constituting a cam, and the nozzle adjacent to the seat being formed as an abutment for engagement by said cam when the valve is turned.

In testimony whereof I have affixed my signature, in presence of two witnesses.

ELMER S. STACK.

Witnesses:
ARTHUR H. BROWN,
PETER W. PEZZETTI.